(12) United States Patent
Mikhalev et al.

(10) Patent No.: US 7,129,609 B1
(45) Date of Patent: Oct. 31, 2006

(54) MAGNETO-FLUIDIC SEAL WITH WIDE WORKING TEMPERATURE RANGE

(75) Inventors: Yuri O. Mikhalev, Ivanovo (RU); Sergei G. Lysenkov, Ivanovo (RU)

(73) Assignee: Ferrolabs, Inc., Dulles, VA (US)

( * ) Notice: Subject to any disclaimer, the term of this patent is extended or adjusted under 35 U.S.C. 154(b) by 0 days.

(21) Appl. No.: 11/213,857

(22) Filed: Aug. 30, 2005

(51) Int. Cl.
*H02K 7/09* (2006.01)

(52) U.S. Cl. ............... 310/90.5; 384/133; 277/410

(58) Field of Classification Search ........... 310/90.5, 310/90; 384/133; 277/410
See application file for complete search history.

(56) References Cited

U.S. PATENT DOCUMENTS

| | | | |
|---|---|---|---|
| 2,863,538 A * | 12/1958 | Jaeschke ............... | 192/21.5 |
| 3,612,549 A | 10/1971 | Berkowitz | |
| 3,612,630 A * | 10/1971 | Rosensweig ............ | 310/90.5 |
| 3,810,683 A * | 5/1974 | Keever et al. ............ | 310/90.5 |
| 3,848,879 A | 11/1974 | Hudgins | |
| 4,054,293 A | 10/1977 | Hoeg et al. | |
| 4,252,353 A | 2/1981 | Raj et al. | |
| 4,290,610 A | 9/1981 | Lizogub et al. | |
| 4,304,411 A * | 12/1981 | Wilcock et al. ............ | 277/427 |
| 4,340,233 A | 7/1982 | Yamamura et al. | |
| 4,357,022 A | 11/1982 | Raj | |
| 4,357,023 A | 11/1982 | Yamamura | |
| 4,357,024 A | 11/1982 | Raj | |
| 4,407,508 A | 10/1983 | Raj et al. | |
| 4,434,987 A | 3/1984 | Albers et al. | |
| 4,444,398 A | 4/1984 | Black, Jr. et al. | |
| 4,445,696 A | 5/1984 | Raj et al. | |
| 4,506,895 A | 3/1985 | Raj | |
| 4,592,557 A | 6/1986 | Iversen | |
| 4,604,229 A | 8/1986 | Raj et al. | |
| 4,605,233 A | 8/1986 | Sato | |
| 4,607,500 A | 8/1986 | Bolton et al. | |
| 4,628,384 A | 12/1986 | Raj et al. | |
| 4,630,943 A | 12/1986 | Stahl et al. | |
| 4,671,679 A * | 6/1987 | Heshmat ............ | 384/133 |
| 4,681,328 A | 7/1987 | Ritter et al. | |
| 4,696,481 A | 9/1987 | Iversen | |
| 4,824,122 A | 4/1989 | Raj et al. | |
| 4,827,454 A | 5/1989 | Okazaki | |
| 4,830,384 A | 5/1989 | Raj et al. | |
| 4,890,850 A | 1/1990 | Raj et al. | |

(Continued)

FOREIGN PATENT DOCUMENTS

RU  2208584  4/2001

(Continued)

OTHER PUBLICATIONS

Methods of regulating charging and functional properties of oil-solvable surface-active agents and lubricants, Chapter 8 (1978).

*Primary Examiner*—Dang Le
(74) *Attorney, Agent, or Firm*—Bardmesser Law Group (57) ABSTRACT

A magneto-fluidic seal includes a shaft; a sleeve surrounding the shaft; a housing made of soft magnetic material surrounding the sleeve; a magnet conducting a magnetic flux to the sleeve; and a magnetic fluid in a gap between the sleeve and the shaft, and/or in a gap between the sleeve and the housing. Optionally, the sleeve includes a channel on a longitudinal side, and wherein the magnet is positioned in the channel. The channel can be substantially circular or polyhedral. The magnet is preferably offset from a bottom of the channel, and oriented radially. Preferably, the magnet includes a plurality of segments, or flat plate-shaped magnets, arranged substantially evenly and circumferentially around the shaft.

17 Claims, 6 Drawing Sheets

U.S. PATENT DOCUMENTS

| | | |
|---|---|---|
| 4,927,164 A | 5/1990 | Raj et al. |
| 4,940,248 A | 7/1990 | Kilthau et al. |
| 4,989,885 A | 2/1991 | Iwata et al. |
| 5,011,165 A | 4/1991 | Cap |
| 5,018,751 A | 5/1991 | Raj et al. |
| 5,050,891 A | 9/1991 | Ishikawa |
| 5,092,611 A | 3/1992 | Ehmsen et al. |
| 5,137,286 A * | 8/1992 | Whitford ............... 277/410 |
| 5,152,539 A | 10/1992 | Takii et al. |
| 5,156,523 A | 10/1992 | Maier |
| 5,161,902 A | 11/1992 | Fujii |
| 5,165,701 A | 11/1992 | Koba |
| 5,250,865 A * | 10/1993 | Meeks ................. 310/90.5 |
| 5,660,397 A | 8/1997 | Holtkamp |
| 5,841,211 A * | 11/1998 | Boyes ..................... 310/90 |
| 5,954,342 A * | 9/1999 | Mikhalev et al. ........ 277/410 |
| 5,975,536 A | 11/1999 | Helgeland |
| 6,199,867 B1 * | 3/2001 | Mahoney et al. ........ 277/410 |
| 6,672,592 B1 * | 1/2004 | Anzai .................... 277/410 |

FOREIGN PATENT DOCUMENTS

| | | |
|---|---|---|
| WO | WO 88/08495 * | 11/1988 |

* cited by examiner

MAGNETO-FLUIDIC SEAL WITH WIDE WORKING TEMPERATURE RANGE

FIELD OF THE INVENTION

The present invention relates to seals for use in rotating and other machinery, and more particularly, to magnetofluidic seals with a wide operating temperature range.

BACKGROUND OF THE INVENTION

When a magnetic field is not present, a magnetic fluid, or ferrofluid, functions like a typical fluid, for example, taking the shape of a container in which it is stored. However when subjected to a magnetic field, the magnetic particles within the fluid align with the magnetic flux lines provided by an associated magnet. Magneto-fluidic seals, utilizing a magnetic fluid, are particularly useful for forming seals around shafts, for example rotating shafts such as a stirring shaft for a reactor or bioreactor, or a power delivery shaft. These magneto-fluidic seals are particularly useful for forming a hermetic environment for the exclusion of contaminants and preventing escape of biological matter from an enclosed space into the environment.

Conventional magneto-fluidic seals for shafts are formed between a pole piece and a sleeve affixed to the shaft. The pole piece includes an annular-shaped magnet defining north and south polarities of the pole piece. The pole piece and the sleeve are separated by a gap. Magnetic fluid fills the gap, forming a hermetic seal between the pole piece and the sleeve.

The magnetic fluid generally includes a suspension of dispersed magnetic particles coated with an anti-aggregation agent that forms a colloid. The magnetic fluid wears out when high magnetic fields are applied to the magnetic fluid over a long period of time due to clumping of the magnetic particles and loss of homogeneity, which decreases the reliability of the magneto-fluidic seal.

Conventional single stage magnetofluidic seals, for example, such as those illustrated in U.S. Pat. No. 5,954,342, include a non-magnetic housing, within which a magnetic system is installed, that includes a shaft and a ring shaped magnet. The magnet includes north and south poles, which abut the body of the magnet. The magnetic fluid is held in place by a magnetic field in a working gap. The magnet generates a magnetic field. The working gap includes magnetic field concentrators, such that the magnetic field intensity is the highest at locations where the magnetic fluid is positioned. The presence of the magnetic fluid, which, when magnetized, forms a structure somewhat analogous to an O-ring, provides for a sealing effect. Each such magnetic field concentrator is therefore a location of a ring-like arrangement of magnetic fluid, and each such ring-like arrangement therefore provides a sealing effect.

One problem with such conventional magnetofluidic seals is a relatively limited range of working temperatures, and a low reliability due to the presence of actual O-rings, which are typically made of rubber or a similar material. For example, if the working temperature range of the magnetic fluid is typically between 173 and 473° Kelvin (about −100° C. to about 200° C.), while the O-ring has a working temperature of 223 to 473° Kelvin (about −50° C. to about 200° C.), the effective working temperature range of the entire magnetofluidic seal structure is therefore 223 to 473 Kelvin.

Another conventional magnetofluidic seal includes a non-magnetic housing, ball bearings, a shaft, and a sleeve that includes several channels, into which permanent magnets are placed. Several such permanent magnets are typically located in the channel, such that, collectively, they form a ring-like structure, or a ring-like structure with gaps therein. Several such rows, or rings, of magnets can be used in a single magnetofluidic seal, with their constituent magnets typically of relatively simple shape, being evenly distributed throughout the circumference of the channel. The static gap between the sleeve and the housing is generally sealed using a conventional O-ring. However, this structure also suffers from the same disadvantage, and that the working temperature range of the entire structure is generally limited by the working temperature range of the O-ring.

Accordingly, there is a need in the art for a magnetofluidic seal with an expanded working temperature range, particularly one that is not limited by the working temperature range of the O-rings used in the structure.

BRIEF SUMMARY OF THE INVENTION

The present invention relates to a magneto-fluidic seal with wide working temperature range that substantially obviates one or more of the disadvantages of the related art.

In one aspect, a magneto-fluidic seal includes a shaft; a sleeve surrounding the shaft; a housing made of magnetic material surrounding the sleeve; a magnet generating a magnetic field in the sleeve; and a magnetic fluid in a gap between the sleeve and the shaft and in a gap between the sleeve and the housing. Optionally, the sleeve includes a channel on a longitudinal side, and wherein the magnet is positioned in the channel. The channel can be substantially circular or polyhedral. The magnet is preferably offset from a bottom of the channel, and oriented radially. Preferably, the magnet includes a plurality of segments arranged substantially evenly and circumferentially around the shaft.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

The present invention permits an increase in the working temperature range of the magnetofluidic seal. This is accomplished through a number of possible mechanisms. One such mechanism is through replacement of O-rings used in static gaps in the conventional magnetofluidic seals with magnetofluidic components. Another such mechanism involves elimination of static gaps altogether. Yet another such mechanism is through the increase in a critical pressure differential that the magnetofluidic seal is capable of handling.

According to one embodiment of the present invention, the magnetofluidic seal includes a housing, bearing(s), a shaft, a sleeve that includes magnetic field concentrators (alternatively, the concentrators can be formed on the surface of the shaft itself), and a magnetic fluid. The housing is made of magneto-conductive, or magnetizable, material. Accordingly, the longitudinal surface of the sleeve has one or two (or, optionally, evern more) channels, or grooves, in the shape of a ring or a polyhedron, which has permanent magnets installed therein, with a gap between the magnets and the "bottom" of the channel. The magnets have a radial direction of magnetization, while the ring-like channels are preferably formed symmetrically on the longitudinal surfaces of the sleeve, relative to the gaps between the magnets, as well as on the outer cylindrical surface of the sleeve, and on the inner cylindrical surface of the magneto-conductive housing.

Also, the inner cylindrical surface of the magnetic conductive housing optionally includes additional concentrators of the magnetic field. At the same time, the sleeve can be fixed within the housing, while the static gap between the housing and the sleeve is filled with a magnetic fluid. Additionally, the sleeve can be slidably mounted and then fixed on the shaft, while one or two ring-like channels can be formed on its longitudinal surface. Furthermore, the sleeve can be formed integral with the housing and/or the shaft, while one of the channels includes additional magnets.

Thus, the above designs permit use of a magnetic fluid seal in place of an O-ring, which in turn permits a higher reliability magnetofluidic seal structure, and a structure that is adapted to work in a wider temperature range. Preferably, this is accomplished by using all of the mechanisms described above, in other words, by making the housing of a soft magnetic material, by forming channels in the sleeve and filling the channels with a number of sectional magnets such that the magnets have a gap between them and the bottom of the channel, and by making the channels on the inner surface of the sleeve symmetrical relative to the gaps such that the primary magnetic flux direction is through the static gap (between the housing and the sleeve) and the dynamic gap (between the sleeve and the shaft), thereby enabling the magnetic fluid to act as a seal everywhere.

If the outer surface of the sleeve (or the inner surface of the cylindrical housing) has additional concentrators of the magnetic field, disposing the sleeve in a fixed manner relative to the housing, and filling the static gap between the magnetizable housing and the sleeve with the magnetic fluid, provides for a sealing effect without the use of O-rings. Fixing the sleeve on the shaft, and forming one or more channels on the radially outer surface of the sleeve (i.e., facing the housing) permits creation of a dynamic gap between the housing and the sleeve, which provides for better conditions for cooling of the magnetic fluid, which is located closer to the outer surface of the housing, thereby making it easier to conduct the heat away from the magnetic fluid. This, in turn, permits expanding the working temperature range of the overall device.

Forming the sleeve integrally with the housing, or integrally with the shaft, removes one of the static gaps at issue, and therefore, removes the need for an additional O-ring. Placing additional magnets in at least one of the channels permits increase in the critical pressure differential that the magnetofluidic seal is able to handle, and therefore increases the overall reliability of the magnetofluidic seal.

Figure 1A:
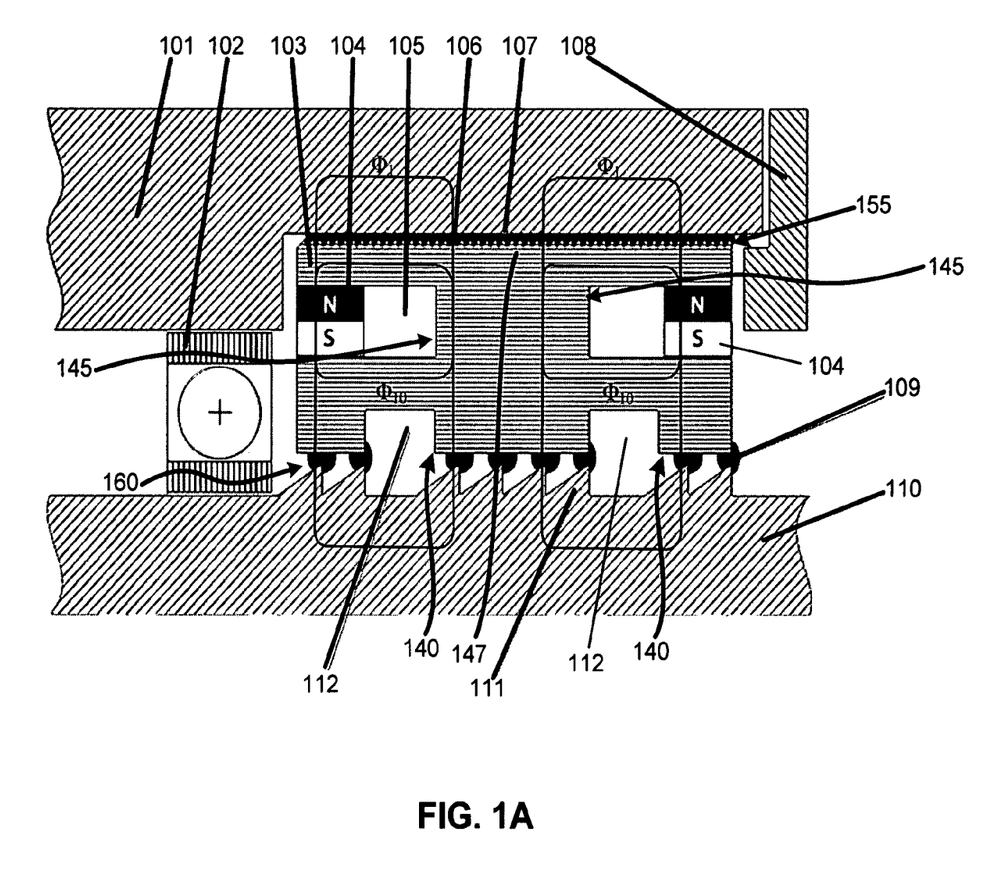
FIG. 1A is a cross-sectional view of one embodiment of a magneto-fluidic seal.
Figure 1B:
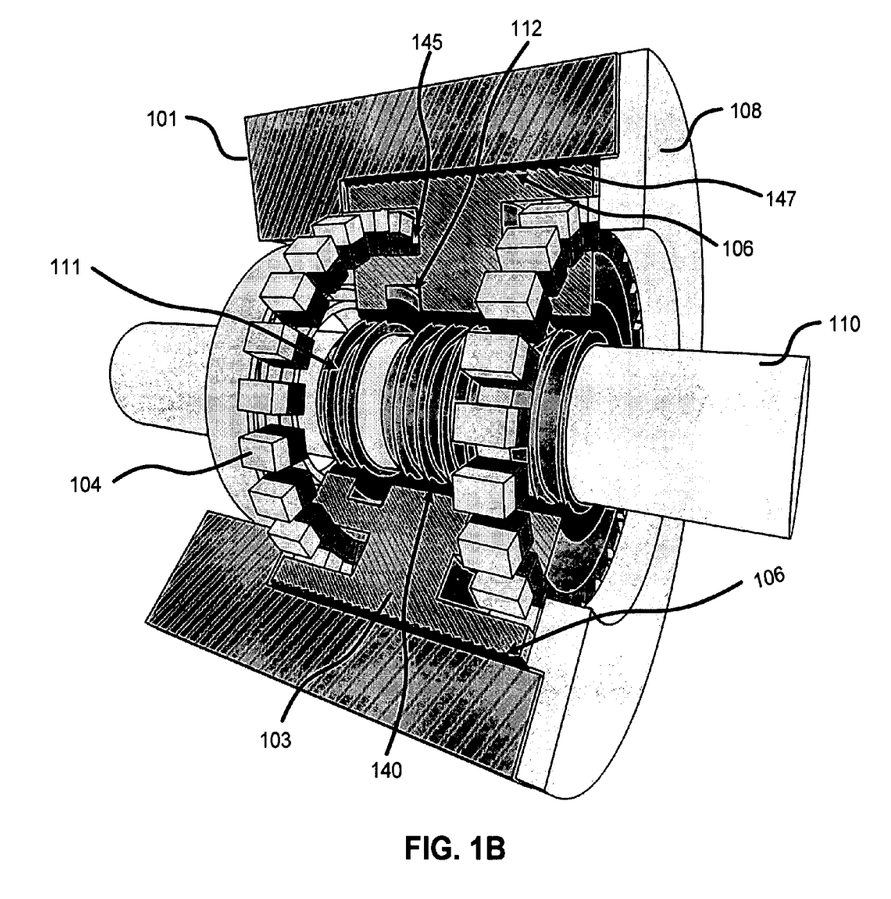
FIG. 1B is a three-dimensional partial cutaway view of the embodiment of FIG. 1A.
Figure 4A:
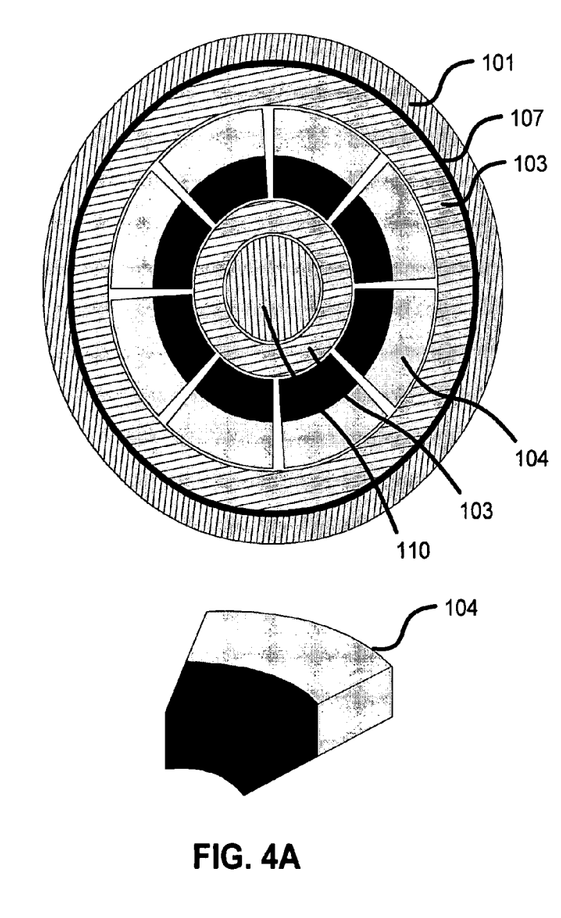
FIG. 4A shows a cross-sectional view of the embodiment of FIG. 1A.
Figure 4B:
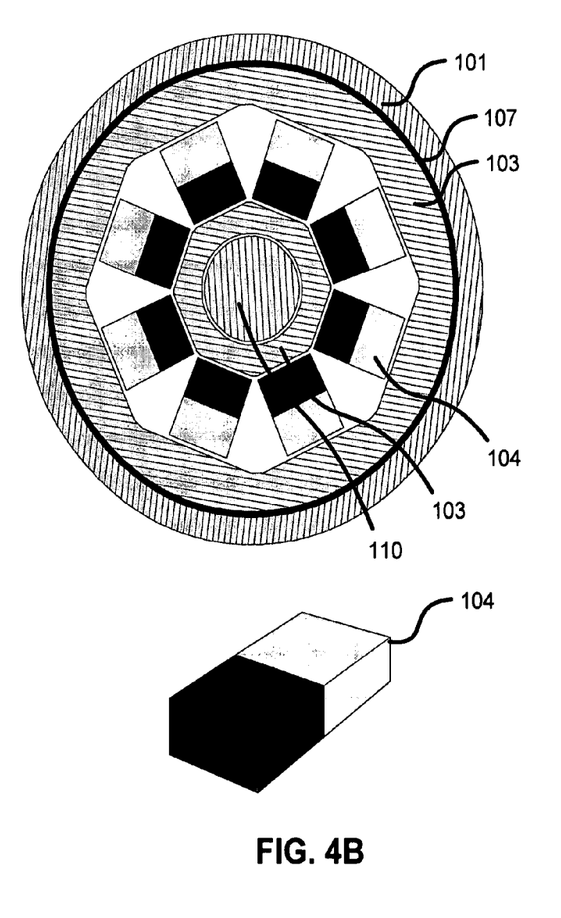
FIG. 4B shows a cross-sectional view of the embodiment of FIG. 1A, but with a polyhedral channel for magnets.

FIGS. 1A, 1B and 4A illustrate one embodiment of the invention, with FIG. 1A showing a longitudinal cross section of a magnetofluidic seal according to the embodiment, FIG. 1B illustrating a three dimensional partial cutaway view of the device of FIG. 1A, and FIG. 4A showing a cross-sectional view. As shown in FIG. 1A, a housing 101 encloses a sleeve 103 and a rotating shaft 110. The rotating shaft 110 is mounted on two (or more) bearings 102, which may be, for example, ball bearings or roller bearings. The inner surface 140 of the sleeve 103 includes one or two (or more) grooves 112, in the form of a ring (see FIG. 4A) or a polyhedron (see FIG. 4B). Permanent magnets 104 are placed in the channels 105. The permanent magnets 104 typically include a number of individual magnets of relatively simple shape, which are distributed circumferentially and evenly, with a gap (unlabeled) between the magnets 104 and the "bottom" 145 of the channel 105. The gap may be empty, filled with air, or filled with a non-magnetic material.

The inner surface 140 of the sleeve 103 (i.e., the side of the sleeve 103 that faces the shaft 110) has additional grooves 112 formed therein. Magnetic field concentrators 111 are located either on the surface of the shaft 110 (as shown in FIGS. 1A–1B), or on the inner surface of the sleeve 103 (not shown in FIGS. 1A–1B). The gap between the sleeve 103 and the shaft 110 is filled with magnetic fluid 109, which forms "quasi-O-rings," or ring-like barriers, at each concentrator 111. An external cylindrical surface 147 of the sleeve 103, or the inner cylindrical surface of the housing 101 can include additional concentrators 106 for the magnetic field. Magnetic fluid 107, which also forms O-ring-like seals, or barriers, is located between the sleeve 103 and the housing 101. The static gap 155 between the housing 101 and the sleeve 103 is therefore filled with magnetic fluid 107. The housing 101 can also include a lid 108, mounted as shown in FIG. 1.

Further with reference to FIG. 1A, the primary magnetic flux $\Phi_1$ from each permanent magnet 104 passes through the northern pole of the magnet 104, then through the sleeve 103, through the additional field concentrator 106, through the static gap 155 between the outer surface of the sleeve 103 and the housing 101 (that includes the magnetic fluid 107), then again through the static gap with the magnetic fluid 107, through magnetic field concentrators 106, the sleeve 103, through the dynamic gap 160 between the inner surface 140 of the sleeve 103 and the shaft 110 (that includes the magnetic fluid 109), through the concentrators 111, the shaft 110, another concentrator 111, magnetic fluid 109, sleeve 103 and then back to the south pole of the permanent magnet 104. This provides the required magnetic field to retain the magnetic fluid in both the static and dynamic gaps. The additional magnetic fluid 107 and the primary magnetic fluid 109, being in magnetized by the magnetic flux, form ring-like magnetofluidic barriers at the location of each field concentrator 106 and 111. This provides for a relatively high pressure differential between that the seal can withstand. Generally, the maximum pressure differential that the seal is able to handle is proportional to the number of field concentrators and the maximum magnetic flux through the magnetic fluid, before saturation. The primary magnetic flux $\Phi_1$ should be as high as possible, therefore, the poles of the magnets 104 should be as close as possible to the sleeve 103. At the same time, the magnets 104, when placed in the channels 105, should preferably be in the form of segments of a circle (see FIG. 4A). If the channel 105 is polyhedral in shape (see FIG. 4B), rather than circular, the magnets can be straight, as opposed to sectional, or curved, or can be other shapes.

Note that a parasitic magnetic flux $\Phi_{10}$ from each permanent magnet 104 pass through the northern pole of the magnet 104, sleeve 103, and the south pole of the magnet 104. The parasitic magnetic flux $\Phi_{10}$ serve no useful purpose as far as maintaining the magnetic fluid in its place, therefore, they should be reduced to the extent possible. To accomplish this, the thickness of the sleeve 103 above and below the channel 105 should be minimized, so that the body of the sleeve 103 at that location should have saturated magnetic flux densities therein. In this case, the magnitude of the parasitic magnetic flux $\Phi_{10}$ is roughly 10–15% of the primary magnetic flux $\Phi_1$, which is generally acceptable, and has little effect on the maximum pressure differential that the seal can maintain. In the structures described above, the static gaps of the magnetofluidic seal use magnetic fluid instead of O-rings, therefore, the working temperature range of the overall device depends only on the working temperature range of the magnetic fluid, rather than the O-rings working temperature range.

The advantage of the structure discussed above can be illustrated as follows. For example, U.S. Pat. No. 6,199,867 shows an example of the use of an O-ring in the static gap between a sleeve and a housing. This limits the working temperature range of the overall magneto-fluidic seal to the working range of the O-ring. Typically, O-rings, being made of rubber or similar materials, become brittle and ineffective at low temperatures, for example, below −50° C. Additionally, conventional magneto-fluidic seals typically have relatively high parasitic magnetic flux passing through various portions of the sleeve, which is useless, and is essentially wasted, for the primary purpose for which the magnets are utilized in such devices—that is for maintaining the magnetic fluid in place. In some cases, the value of the parasitic magnetic flux can be as high as 90–95% of the overall magnetic flux generated by the magnets, which is an extremely high number, and therefore a very high degree of waste in the overall system. In order to reduce the wasted magnetic flux, it is necessary to saturate the steel through which the magnetic flux passes (or whichever material the sleeve is made of), so that the magnetic flux density in the working gap (for example, the gap between the sleeve and the shaft, if this is the dynamic gap) is as high as possible.

The magnetic flux $\Phi$ required to saturate steel is defined by the equation:

$$\Phi = B_s S_p = B_s b 2\pi R_p$$

where $B_s$ is the magnetic flux density necessary to saturate the steel, the magnetic flux density necessary to saturate the steel, $S_p$ is the area of the cross-section of a single magnetic pole (i.e., the sleeve) between the bottom of the channel and the outer diameter of the sleeve, b is the thickness of the sleeve between the bottom of the channel and the outer diameter, and $R_p$ is the outer diameter of the sleeve. On the other hand, the same magnetic flux can be derived from the equation:

$$\Phi = B_o S_m = B_o h 2\pi R_s$$

where $B_o$ is the magnetic flux density in a neutral cross-section of the magnets, $S_m$ is the pole area of the magnets, h is the depth of the channel required for the additional magnets, and $R_s$ is the radius of the shaft. These equations can be rewritten to determine the depth of the channel for the additional magnets as follows:

$$h = B_s b R_p / (B_o R_s)$$

Typical values of the magnetic flux densities include $B_s$=2.2 Tesla, $B_o$=0.6 Tesla for sumarium-cobalt ($Sm_2Co_5$) magnets, the thickness of the sleeve between the bottom of the channel and the outer diameter b=3 millimeters and a ratio of $R_p/R_s$=2, the depth of the channel for the additional magnets would be about 22 millimeters. For neodymium-iron-boron magnets, $B_o$=~0.8 Tesla and h=~16.5 millimeters. For ferrite-barium magnets, $B_o$=~0.22 Tesla and h=~60 millimeters. In other words, in the conventional device, the outer diameter needs to increase by 2 h in order to saturate the sleeve in its thinnest portion by adding magnets, which is a significant in size, and frequently results in a significant increase in cost.

U.S. Pat. No. 5,975,536 illustrates a system where magnets are located between the shaft and the cylindrical housing, and are formed together with the shaft, thereby forming a magnetic system that rotates together with a shaft. The device illustrated in this patent also suffers from high parasitic magnetic flux, which in turn requires the use of additional magnets in order to saturate the steel. Furthermore, the outer radial dimension of the magnetic system become larger, the working gap moves radially outward, which leads to a decrease in the acceptable rate of rotation due to a higher centrifugal forces and due to generally higher waste heat generation, which needs to be dissipated.

The increase in the outer radial dimension of the magnetic system due to the addition of the magnets necessary for saturation of the steel can, in a first approximation, be derived from the condition that the entire magnetic flux should flow through the shaft. This magnetic flux density, which is necessary to saturate the steel, can be derived from the equation.

$$\Phi = B_s S_s = B_o \pi R_s^2$$

where the $B_s$ is the magnetic flux density necessary for saturation of the shaft, $S_s$ is the cross-sectional area of the shaft under the magnets, $R_s$ is the radius of the shaft under the magnets. On the other hand, the same magnetic flux can be derived from the equation:

$$\Phi = B_o S_m = B_o \pi (R_p^2 - R_s^2)$$

where $B_o$ is the magnetic flux density in a neutral cross-section of the magnets, $S_m$ is the pole area of the magnets, $R_p$ is the outer radius of the magnets, and $R_s$ is the radius of the shaft underneath the magnets. These equations can be used to derive the increase in the outer radial dimension of the magnetic system as follows:

$$R_p/R_s = \sqrt{1 + B_s/B_o}$$

Considering that for most types of steel, $B_s \geq 1.8$ Tesla, and for samarium-cobalt magnets, $B_o=0.6$ Tesla, the ratio $R_p/R_s$ is greater than or equal to 2. For neodymium-iron-boron magnets, $B_o=0.8$ Tesla and $R_p$ is greater than or equal to 1.8. For ferrite-barium magnets, $B_o=0.22$ Tesla and $R_p/R_s \geq 3$.

Therefore, even for the best available magnets, the outer radial dimension of the conventional magnetic system increases by a factor of at least 2. Since the centrifugal forces are proportional to the radius of the rotating system, the maximum acceptable rate of rotation of the system increases by more than a factor of 2. Various frictional forces generated in the system are typically proportional to the cube of the linear dimension. Therefore the amount of heat that needs to be conducted away increases by a factor of at least 8, which in turn requires significant additional efforts in cooling the magneto-fluidic seal at high rates of rotation. Alternatively, this can be accomplished by the use of liquid nitrogen for cooling (instead of water or ethylene glycol, or reducing the rate of rotation of the shaft by a factor of 8. In the proposed device, the parasitic magnetic flux is regulated and reduced by controlling the depth of the grooves 112 and 213, which in turn determines the minimal acceptable thickness of the sleeve through which the parasitic magnetic flux can flow. In order to reach the material of the sleeve 103, additional magnets may be required. However, the dimension of the magnets 104 increases in the axial direction of the sleeve 103, since the magnets are radial (i.e., perpendicular to the axial direction of the device). Since the entire magnetic flux due to the additional magnets passes through the thin portion of the sleeve 103, the following equation can be shown to be true:

$$B_o L_m = B_s \Delta$$

$B_o$ is the magnetic flux density in the neutral cross-section of the magnets, $L_m$ is the increase in the dimension of the magnets 104 in the axial direction, $B_s$ is the saturation magnetic flux density of the shaft, and $\Delta$ is the minimum thickness of the sleeve 103 above the groove 112. Therefore, the increase in the dimension of the magnets 104 and the axial direction can be derived as $$L_m = B_s \Delta / B_o$$

The minimum dimension of the sleeve 103 is determined based on the saturation condition and based on considerations of mechanical stability of the sleeve. Typically, for shafts that have diameters of 10 to 100 millimeters, the minimum thickness of the sleeve 103 is on the order of 0.1–1.0 millimeters. For samarium-cobalt magnets, the increase in the axial dimension $L_m$ is on the order of 1 millimeters with a $\Delta=0.3$ mm, which is a relatively trivial number. For neodymium-iron-boron magnets, the $L_m$ increase is on the order of 0.7 millimeters. Considering the fact that for most such devices, typical magnet dimensions are on the order of 10–12 millimeters, the increase in the axial dimension of the magnets is only on the order of 6–10%. Additionally, the outer diameter of the overall magneto-fluidic seal changes very little, if at all, which means that the centrifugal forces acting on the magneto-fluidic seal also do not change, and the waste heat that needs to be dissipated also does not change. Therefore, the maximum rate of rotation of the shaft need not change as well.

Typical materials that can be used for shafts include any magneto-conductive, or soft magnetic steel, preferably stainless steel, for example, 17-4 PH steel, for sleeves and housings. Any soft magnetic steel can be used, preferably stainless steel, such as SUS 416 type steel.

Figure 2:
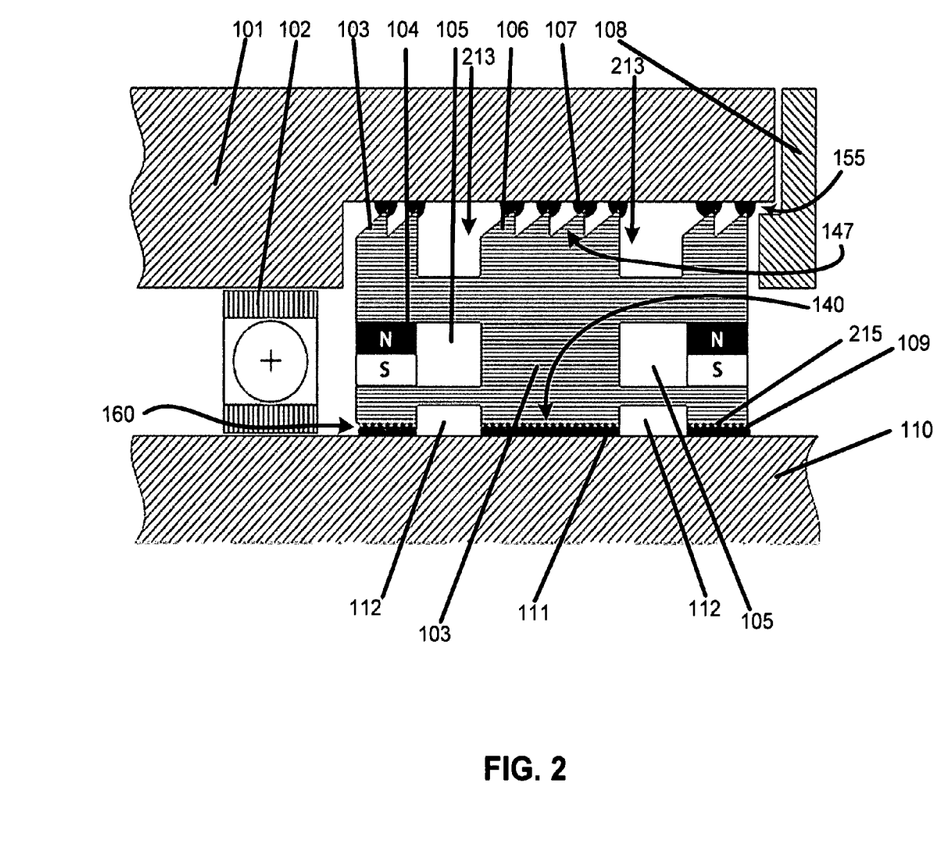
FIG. 2 is a cross-sectional view of another embodiment of a magneto-fluidic seal.

FIG. 2 illustrates an alternative embodiment of the invention. As shown in FIG. 2, the sleeve 103 is mounted axially and fixedly on the shaft 110, such that the gap 160 becomes the static gap. A plurality of small concentrators 215 are arranged on a side 140 of the sleeve 103 that faces the shaft 110. Magnetic fluid 109 fills in the static gap 160 between the sleeve 103 and the shaft 110. Additionally, a number of field concentrators 106 are located on the outer cylindrical surface 147 of the sleeve 103, with magnetic fluid 107 positioned in the dynamic gap 155 between the sleeve 103 and the housing 101. Note also the grooves 112 on the inner surface of the sleeve 103 (facing the shaft 110) and the grooves 213 on the outer surface 147 of the sleeve 103. Other elements of the device are substantially similarly to those illustrated in FIGS. 1A and 1B.

The device shown in FIG. 2 works analogously to the device shown in FIG. 1A, even though the sleeve is fixed on the shaft 110. At the same time, the structure shown in FIG. 2 provides for better thermal conduction characteristics of the heat from the magnetic fluid to the housing 101. In this case, this results in a higher effective working temperature range.

Figure 3A:
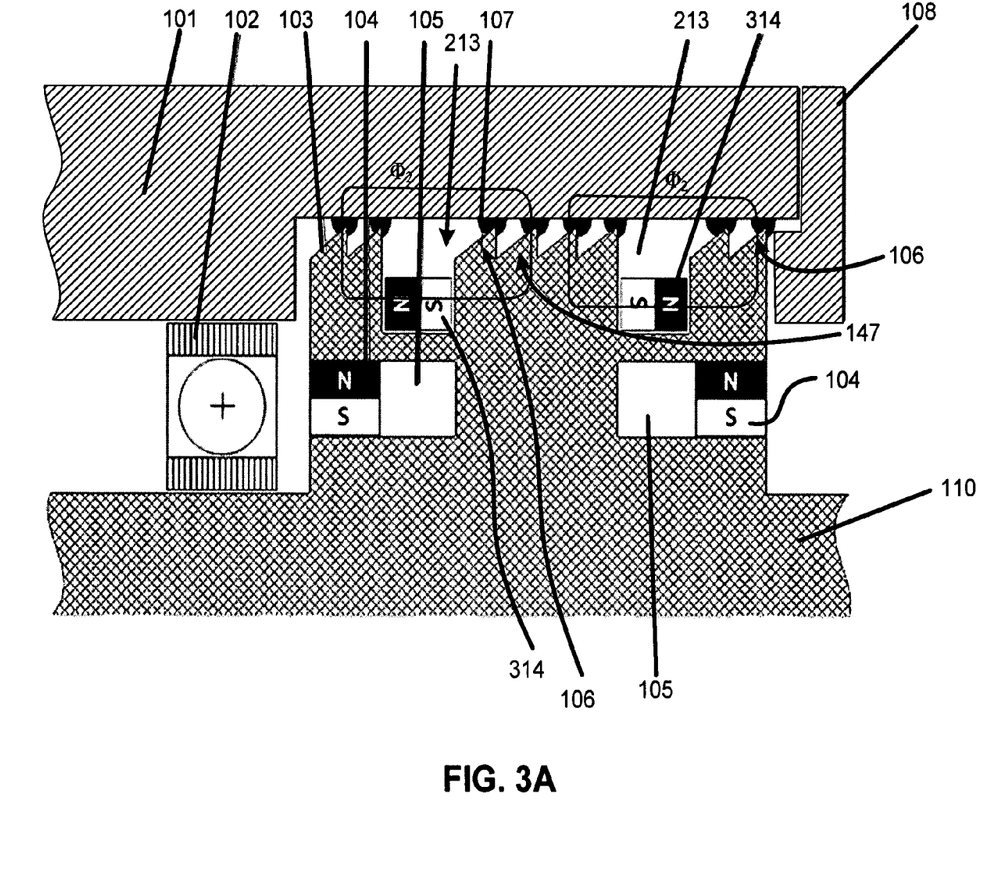
FIG. 3A is a cross-sectional view of another embodiment of a magneto-fluidic seal.
Figure 3B:
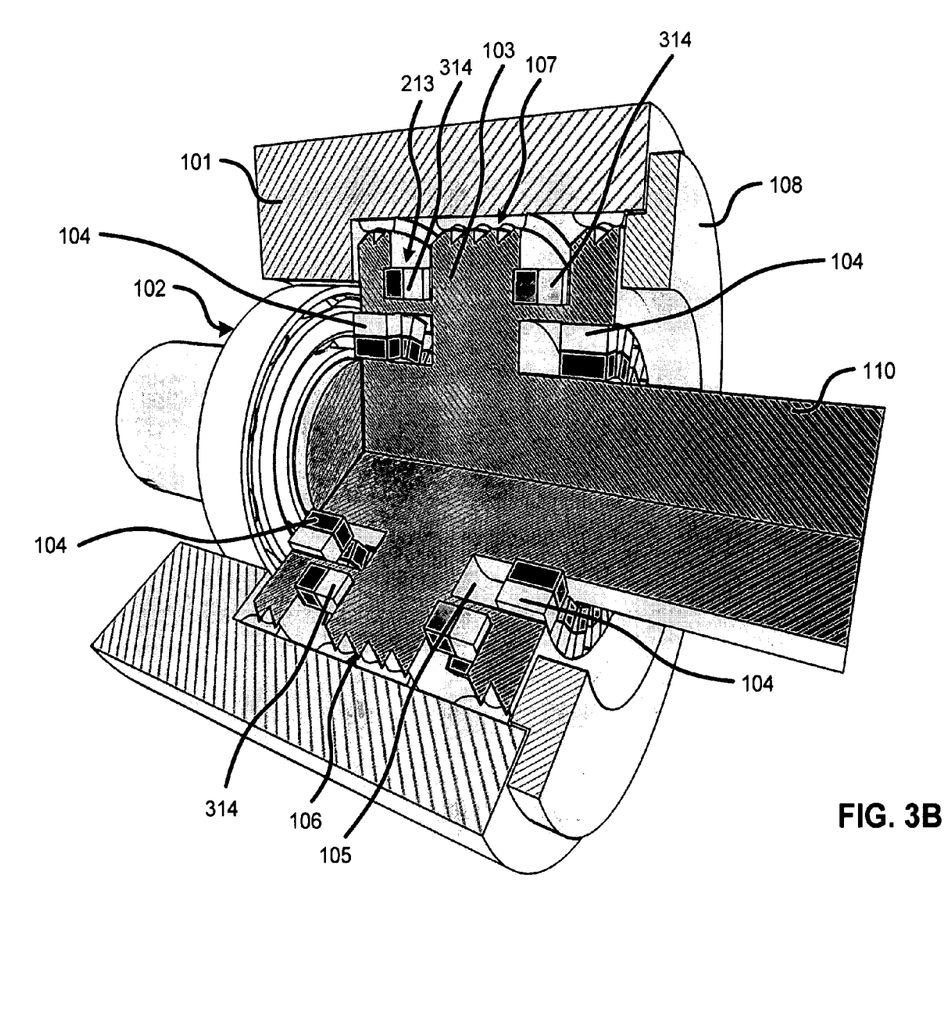
FIG. 3B is a three-dimensional partial cutaway view of the embodiment of FIG. 3A.

FIG. 3A illustrates yet another alternative embodiment of the magnetofluidic seal in cross-sectional view, and FIG. 3B shows a three-dimensional partial cutaway view. As shown in FIGS. 3A–3B, the sleeve 103 is formed integrally with the shaft 110. This eliminates one of the gaps that need to be sealed altogether, albeit at the cost of some added complexity during manufacturing. The sleeve 103 has a number of field concentrators 106 on its outer cylindrical surface 147. Magnets 104 are placed within channels 105, as shown in the figure. Additional magnets 314 are placed in the grooves 213, as also shown in FIGS. 3A–3B. Other elements of the device are as discussed above, with reference to, e.g., FIGS. 1A and 2. Note that the direction of magnetization of the magnets 104 in each groove 105 is oriented in the same direction, while magnetization of the magnets 314 between one channel 213 and the other channel 213 is opposite.

In the device of FIGS. 3A–3B, due to the fact that the sleeve 103 is formed integrally with either the housing 101 or the shaft 110, one of the static gaps can be eliminated altogether. This therefore results in elimination of the O-ring needed for the static gap. Furthermore, when additional magnets 314 are added, an extra magnetic flux $\Phi_2$ is generated, which, passing through the north pole of the magnets 314, the sleeve 103, the dynamic gap between the sleeve 103 and the housing 101, magnetic fluid 107, the housing 101, again the dynamic gap with the magnetic fluid, the sleeve 103 and the south pole of the magnet 314 provides an increased magnetic flux in the dynamic gap. This increases the maximum pressure differential that the magnetic seal can handle, and therefore, increases the reliability of the magnetofluidic seal.

Therefore, as described above, the proposed devices expand the working temperature range of the magnetofluidic seal, as well as provide for an increased reliability of the device.

While specific configurations and arrangements are discussed, it should be understood that this is done for illustrative purposes only, by way of example only, and not limitation. A person skilled in the pertinent art will recognize that other configurations and arrangements can be used without departing from the spirit and scope of the present invention. It will be apparent to a person skilled in the pertinent art that this invention can also be employed in a variety of other applications. Thus, the breadth and scope of the present invention should not be limited by any of the above-described exemplary embodiments, but should be defined only in accordance with the following claims and their equivalents.

What is claimed is:

1. A magneto-fluidic seal comprising:
a shaft;
a housing made of soft magnetic material surrounding the shaft;
a first channel formed in a first longitudinal surface of the shaft;
a first magnet in the first channel and having a radial magnetic field orientation of its poles;
a magnetic fluid in a gap between the shaft and the housing;
a second channel formed in a second longitudinal surface of the shaft;
a second magnet in the second channel and having the radial magnetic field orientation of its poles; and
third and fourth channels formed in the shaft and facing the housing; and
third and fourth magnets in the third and fourth channels, respectively, and having their poles oriented longitudinally,
wherein the magnetic fluid is radially outward of the magnets.

2. The magneto-fluidic seal of claim 1, wherein the first channel is substantially circular.

3. The magneto-fluidic seal of claim 2, wherein the second channel is substantially circular.

4. The magneto-fluidic seal of claim 1, wherein the first channel is substantially polyhedral.

5. The magneto-fluidic seal of claim 4, wherein the second channel is substantially polyhedral.

6. The magneto-fluidic seal of claim 1, wherein the first magnet is offset from a bottom of the first channel.

7. The magneto-fluidic seal of claim 6, wherein the second magnet is offset from a bottom of the channel.

8. The magneto-fluidic seal of claim 1, wherein each magnet includes a plurality of segments arranged substantially evenly and circumferentially around the shaft.

9. The magneto-fluidic seal of claim 1, wherein each magnet includes a plurality of magnetic plates having a substantially rectangular cross-section and arranged substantially evenly and circumferentially around the shaft.

10. The magneto-fluidic seal of claim 1, wherein a portion of the shaft that is surrounded by the sleeve is substantially cylindrical.

11. The magneto-fluidic seal of claim 10, wherein the magnetic fluid in the gap between the shaft and the sleeve is arranged into a plurality of rings of substantially equal diameter.

12. The magneto-fluidic seal of claim 11, further comprising a second magnet located in the sleeve at substantially the same distance from the shaft as the first magnet, the second magnet having its poles oriented radially.

13. The magneto-fluidic seal of claim 12, wherein the magnetic fluid in the gap between the sleeve and the housing substantially fills the entire gap between the sleeve and the housing.

14. The magneto-fluidic seal of claim 1, wherein the first magnet includes a plurality of segments arranged substantially evenly and circumferentially around the shaft.

15. The magneto-fluidic seal of claim 1, wherein the first magnet includes a plurality of magnetic plates having a substantially rectangular cross-section and arranged substantially evenly and circumferentially around the shaft.

16. The magneto-fluidic seal of claim 1, wherein the sleeve includes at least one channel on one longitudinal side, and wherein each channel includes a plurality of magnets, each oriented substantially radially.

17. The magneto-fluidic seal of claim 1, wherein the sleeve includes at least one channel on its outer surface, and further comprising a second magnet in the at least one channel, the second magnet being oriented longitudinally.

* * * * *